(12) United States Patent
Srivastava et al.

(10) Patent No.: US 12,204,917 B2
(45) Date of Patent: Jan. 21, 2025

(54) AUTOMATED EXTENSIBILITY FRAMEWORK

(71) Applicant: SAP SE, Walldorf (DE)

(72) Inventors: Garima Srivastava, Bangalore (IN); Sushama Shadakshary, Bangalore (IN)

(73) Assignee: SAP SE, Walldorf (DE)

( * ) Notice: Subject to any disclaimer, the term of this patent is extended or adjusted under 35 U.S.C. 154(b) by 42 days.

(21) Appl. No.: 18/065,877

(22) Filed: Dec. 14, 2022

(65) Prior Publication Data

US 2024/0202012 A1    Jun. 20, 2024

(51) Int. Cl.
*G06F 9/445* (2018.01)
*G06F 8/36* (2018.01)
*G06F 8/41* (2018.01)

(52) U.S. Cl.
CPC ........... *G06F 9/44526* (2013.01); *G06F 8/36* (2013.01); *G06F 8/427* (2013.01)

(58) Field of Classification Search
CPC ......... G06F 9/44526; G06F 8/36; G06F 8/427
USPC .................................................. 717/106–141
See application file for complete search history.

(56) References Cited

U.S. PATENT DOCUMENTS

| | | | | |
|---|---|---|---|---|
| 7,117,489 B2 * | 10/2006 | Wallman | ................. | G06F 9/445 717/148 |
| 7,565,647 B2 * | 7/2009 | Davidov | ................. | H04L 67/02 717/106 |
| 7,822,939 B1 * | 10/2010 | Veprinsky | ............. | G06F 3/0689 711/170 |
| 8,006,204 B2 * | 8/2011 | Killian | ...................... | G06F 8/53 717/124 |
| 8,438,551 B2 * | 5/2013 | Tonkin | ...................... | G06F 8/42 717/137 |
| 8,639,491 B2 * | 1/2014 | Mann | ........................ | G06F 8/20 717/124 |
| 8,677,141 B2 * | 3/2014 | Erlingsson | .......... | H04L 63/1416 713/168 |
| 9,311,054 B2 * | 4/2016 | Charfi | ..................... | G06F 21/54 |

(Continued)

OTHER PUBLICATIONS

Kuramitsu, "A Symbol-Based Extension of Parsing Expression Grammars and Context-Sensitive Packrat Parsing", ACM, pp. 26-37 (Year: 2017).*

(Continued)

*Primary Examiner* — Anil Khatri
(74) *Attorney, Agent, or Firm* — Fountainhead Law Group, PC

(57) ABSTRACT

An automated extensibility framework is provided to automatically convert or migrate application extensions from a source system to be used on target applications in a target format. Extension artefacts of an extension of a source application on a source system are obtained. Each of the extension artefacts are parsed into a target format of a target platform based on a type of the corresponding extension artefact. Target applications of the target platform are identified based on an identifier of the source application. Extension simulations are compiled for each of the one or more target applications. Then, a user interface is provided which enables a user to select simulations from among extension simulations. Then the selected simulations are published to the target platform such that the corresponding extensions are implemented in corresponding target applications.

17 Claims, 14 Drawing Sheets

(56) References Cited

U.S. PATENT DOCUMENTS

| | | | | |
|---|---|---|---|---|
| 9,552,123 | B1* | 1/2017 | Johnston | G06F 9/451 |
| 10,162,740 | B1* | 12/2018 | Setty | G06F 9/44505 |
| 11,341,142 | B2* | 5/2022 | Hrastnik | G06F 16/24573 |
| 11,561,976 | B1* | 1/2023 | Buchmann | G06F 16/214 |
| 11,936,517 | B2* | 3/2024 | Hendrey | H04L 67/10 |
| 11,983,094 | B2* | 5/2024 | Downie | G06F 11/0778 |
| 2018/0308203 | A1* | 10/2018 | Appu | G06N 3/044 |
| 2023/0315751 | A1* | 10/2023 | Buchmann | G06F 16/27 707/624 |

OTHER PUBLICATIONS

Palihawadana et al, "Tool Support for Traceability Management of Software Artefacts with DevOps Practices", IEEE, pp. 219-134 (Year: 2017).*

Pfenning, "Intensionality, Extensionality, and Proof Irrelevance in Modal Type Theory", IEEE, pp. 221-230 (Year: 2001).*

Mahmood et al, "Reuse Environments for Software Artifacts: Analysis Framework", IEEE, pp. 35-40 (Year: 2013).*

Márquez et al, "Identifying emerging security concepts using Software artifacts through an experimental case", IEEE, pp. 1-6 (Year: 2015).*

Wu et al, "Screen Parsing: Towards Reverse Engineering of UI Models from Screenshots", ACM, pp. 470-483 (Year: 2021).*

\* cited by examiner

AUTOMATED EXTENSIBILITY FRAMEWORK

BACKGROUND

The present disclosure pertains to software application extensions and in particular to transferring or migrating extensions from a source application to a target application.

Software applications can provide support for "extensions" that allow the users (e.g., "key users" or "power users") customize and design how the application looks and works and what type of information is presented and how. For example, an application can provide a user interface presenting different information in "tabs" that can be selected by the user to show tables or "fields" of information and an extension can enable a user to add or customize these tabs and fields. Such "extensibility" in software applications is typically a requirement of software customers, who demand to extend the delivered applications as per their specific custom/business usage.

Many software applications have provided extension mechanisms for customers to create extensions on top of standard software application offerings. For example, users can create their own fields and enhancement implementations to customize applications and their user interfaces (UIs), reports, email templates, form templates, and scenarios.

However, prior extensibility techniques had certain limitations and drawbacks. For instance, they required creation of extensions manually, one by one, and creation of extensions might require both technical knowledge and domain specific knowledge from the user. In prior extensibility techniques there is no automated way to analyze the extensions that have been created for past (e.g., legacy) applications when migrating to a new target platform. Instead, users were required to manually analyze the application (e.g., the transactions used by the application) and then identify what are the areas where extensions are required in the target applications. This is a time taking procedure due to such manual efforts. And there may be situations where there is a need to extend multiple applications in a system. Hence, the amount of time that the user must invest in creating extensions manually using the existing framework may be impractical.

The present disclosure addresses these issue and others, as further described below.

SUMMARY

Some embodiments provide a computer system. The computer system comprises one or more processors and one or more machine-readable medium coupled to the one or more processors. The one or more machine-readable medium storing computer program code comprising sets instructions. The sets of instructions executable by the one or more processors to obtain one or more extension artefacts of an extension of a source application on a source system. The sets of instructions further executable by the one or more processors to parse each of the one or more extension artefacts into a target format of a target platform based on a type of the corresponding extension artefact. The sets of instructions further executable by the one or more processors to identify one or more target applications of the target platform based on an identifier of the source application. The sets of instructions further executable by the one or more processors to compile one or more extension simulations for each of the one or more the one or more target applications. The sets of instructions further executable by the one or more processors to provide a user interface enabling a user to select one or more selected simulations from among the one or more extension simulations. The sets of instructions further executable by the one or more processors to publish the one or more selected simulations to the target platform such that the one or more corresponding extensions are implemented in corresponding target applications.

Some embodiments provide one or more non-transitory computer-readable medium storing computer program code. The computer program code comprising sets of instructions to obtain one or more extension artefacts of an extension of a source application on a source system. The computer program code further comprising sets of instructions to parse each of the one or more extension artefacts into a target format of a target platform based on a type of the corresponding extension artefact. The computer program code further comprising sets of instructions to identify one or more target applications of the target platform based on an identifier of the source application. The computer program code further comprising sets of instructions to compile one or more extension simulations for each of the one or more target applications. The computer program code further comprising sets of instructions to provide a user interface enabling a user to select one or more selected simulations from among the one or more extension simulations. The computer program code further comprising sets of instructions to publish the one or more selected simulations to the target platform such that the one or more corresponding extensions are implemented in corresponding target applications.

Some embodiments provide a computer-implemented method. The computer-implemented method comprises obtaining one or more extension artefacts of an extension of a source application on a source system. The computer-implemented method further comprises parsing each of the one or more extension artefacts into a target format of a target platform based on a type of the corresponding extension artefact. The computer-implemented method further comprises identifying one or more target applications of the target platform based on an identifier of the source application. The computer-implemented method further comprises compiling one or more extension simulations for each of the one or more the one or more target applications. The computer-implemented method further comprises providing a user interface enabling a user to select one or more selected simulations from among the one or more extension simulations. The computer-implemented method further comprises publishing the one or more selected simulations to the target platform such that the one or more corresponding extensions are implemented in corresponding target applications.

The following detailed description and accompanying drawings provide a better understanding of the nature and advantages of the present disclosure.

DETAILED DESCRIPTION

Figure 1:
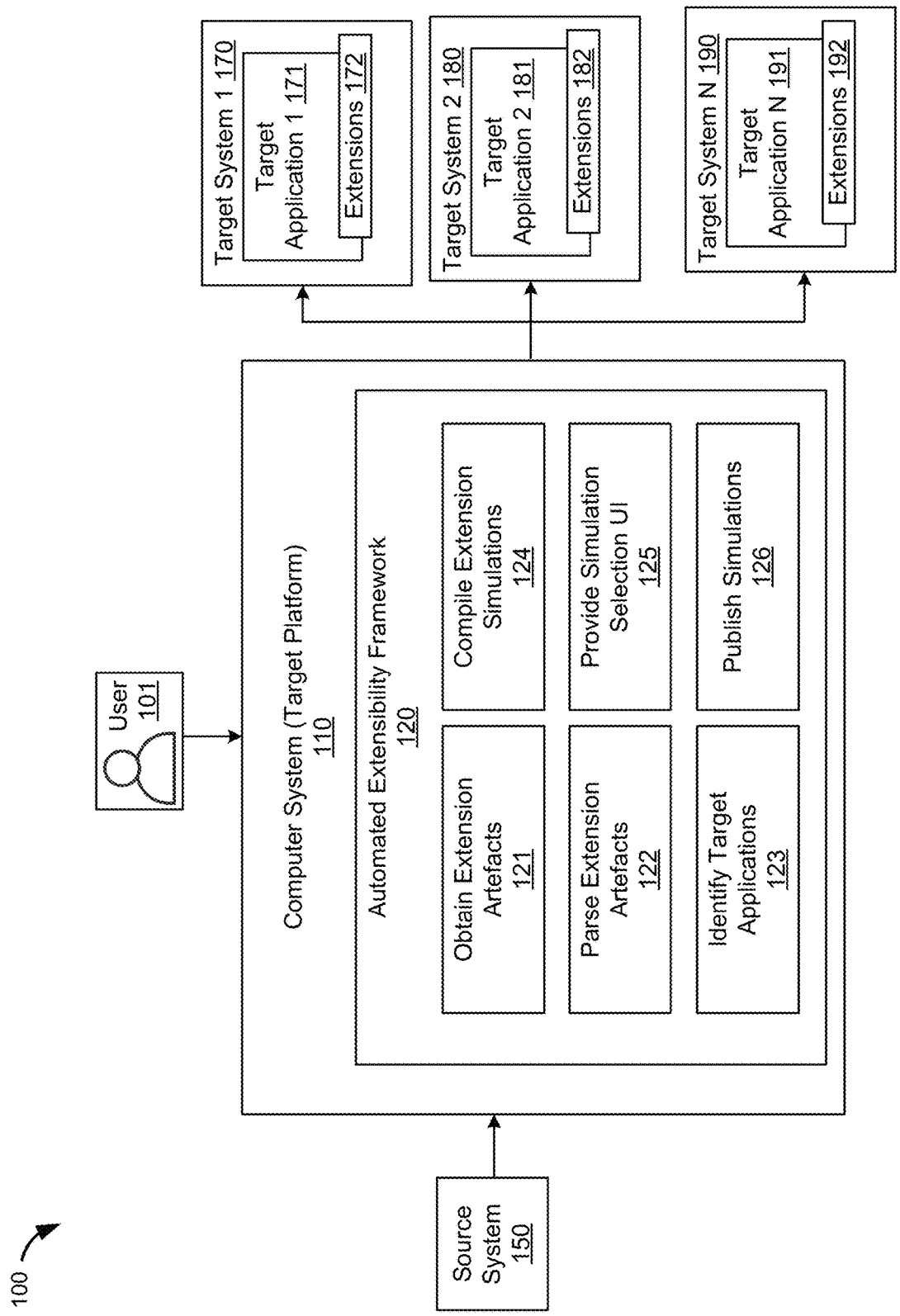
FIG. 1 shows a diagram of a system providing an automated extensibility framework for creating application extensions for a target system using extensions from a source system, according to some embodiments.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

As mentioned above, prior extensibility techniques had certain limitations and drawbacks. For instance, they required creation of extensions manually, users were required to manually analyze the application to identify what are the areas where extensions are required in the target applications and there are situations where there is a need to extend multiple applications in a system.

As of now there is no automated mechanism where the users can create extensions at one-shot, for multiple fields in either one or multiple Applications. This leads to more manual effort as the key user must create extensions one by one on field level.

When the customers/partners need to migrate their software to a new release (e.g., a cloud release), this may result in creating the extensions again on the Applications. This causes increased redundant effort for the user who must create all the extensions again using the existing user tools, manually one by one.

There is a need for an automated extensibility mechanism where a user can create extensions automatically for multiple fields in either one or multiple applications, thereby reducing the manual effort as the user does not need to create extensions one by one on field level. Furthermore, there is a need to migrate software to new releases or platforms without manually recreating the extensions again for the new release/platform.

To address these issues and others, the present disclosure provides an automated extensibility framework that automatically analyzes extensions of a source application, creates corresponding extensions for a target application, and enables a user to review and implement these proposed extensions. This framework is referred to as an "Automated Key-user Extensibility Framework (AKEF)," where the "key-user" refers to a user having knowledge of the software application and domain-specific knowledge but who is not necessarily a software programmer or developer and who would rely on graphical user interfaces to implement extensions (rather than writing code directly). For instance, a key user may know the processes in a specific department or for the whole organization or company in detail, and may be involved in taking decisions, for example, on how a process should be implemented. A key use may be an administrator and/or business process configuration expert for example. In some situations, the term "power user" may be used in the same way as "key user."

This framework automates the key-user extensions in a way that the key user does not need to go and create extensions for applications one-by-one. Rather, the framework would analyze the extensions in the source system and create extension proposals for the target system. This would lead to reduction in the manual effort for creating extensions.

At a high level the automated extensibility framework described herein provides the following functionality. The automated extensibility framework is configured to analyze the customer's source system based upon a specific application and its extension properties that is fed as an input (as opposed to being manually identified by a user as in prior systems and techniques). The automated extensibility framework is configured to identify the corresponding one or many target applications where extensions should be created (as opposed to being manually identified by the user as in prior systems and techniques). The automated extensibility framework is configured to generate multiple proposals of extensions based on the analysis. The automated extensibility framework is configured to provide options to users for selecting one among the several simulated extension proposals. And the automated extensibility framework is configured to publish the extension such that it is generated and usable with the target application.

Figure 2:
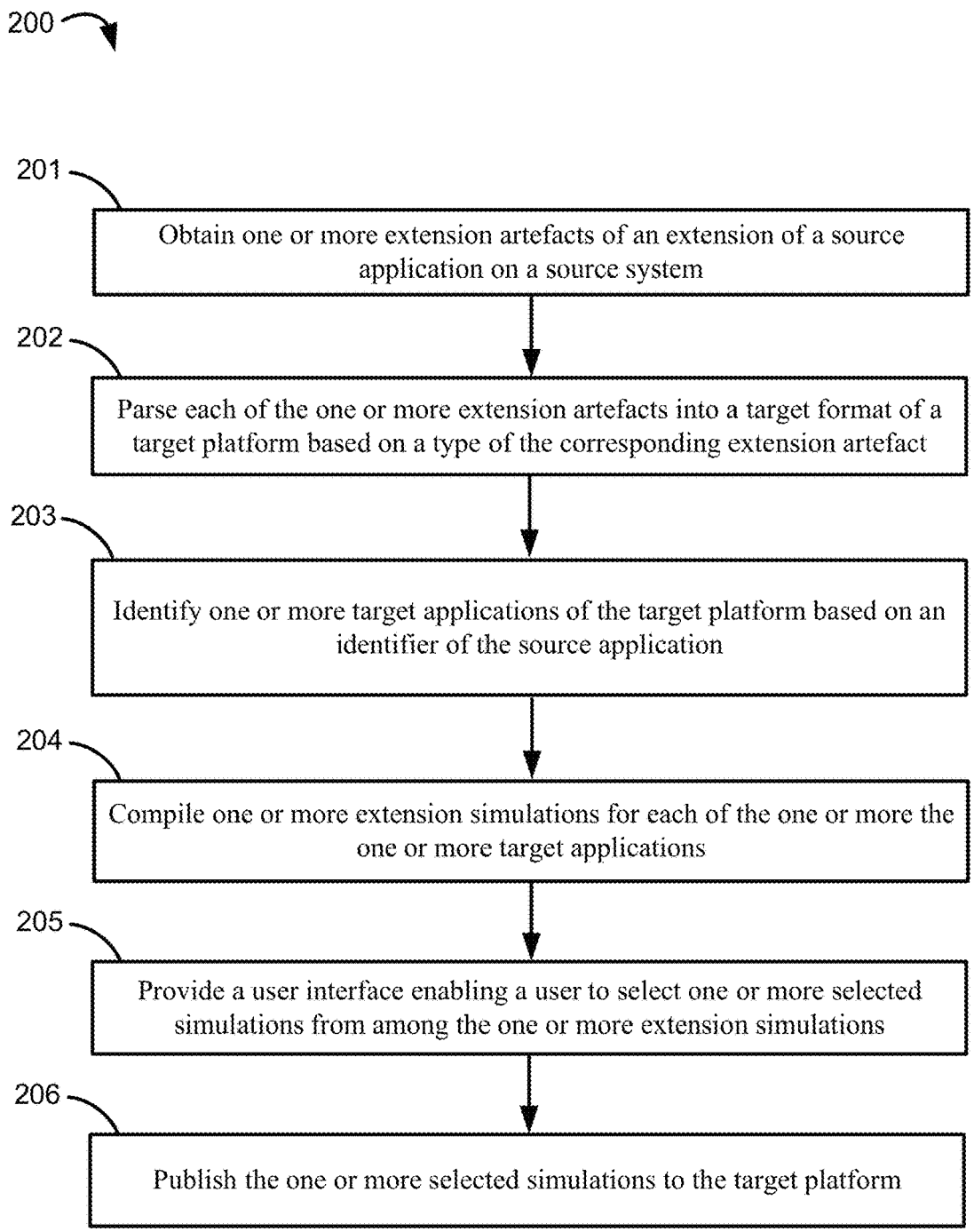
FIG. 2 shows a flowchart of a method for creating application extensions, according to com embodiments.

FIGS. 1 and 2 provide a general description of the automated extensibility framework that apply to various and FIGS. 3-14 describe specific examples of the automated extensibility framework.

FIG. 1 shows a diagram 100 of a computer system 110 providing an automated extensibility framework 120 for creating application 171/181/191 extensions 172/182/192 for a target system 170/180/190 using extensions from a source system 150, according to some embodiments. The computer system 110 may be referred to as a "target platform" as the automated extensibility framework 120 is configured to convert (e.g., parse) application extensions from the source system 150 into a target format of the computer system (target system) 110 such that the target applications 171/181/191 of the target systems 170/180/190 can implemented those extensions 172/182/192.

The automated extensibility framework 120 includes a component to obtain extension artefacts 121, a component to parse extension artefacts 122, a component to identify target applications 123, a component to compile extension simulations 124, a component to provide a simulation selection user interface (UI) 125, and a component to publish simulations 126.

The component to obtain extension artefacts 121 is configured to obtain one or more extension artefacts of an extension of a source application on a source system The component to parse extension artefacts 122 is configured to parse each of the one or more extension artefacts into a target format of a target platform based on a type of the corresponding extension artefact The component to identify target applications 123 is configured to identify one or more target applications of the target platform based on an identifier of the source application.

The component to compile extension simulations 124 is configured to compile one or more extension simulations for each of the one or more target applications 171/181/191.

The component to provide a simulation selection user interface (UI) 125 is configured to enable a user to select one or more simulations from among the one or more extension simulations. Examples of simulation selections and provided below.

The component to publish simulations 126 is configured to publish the one or more selected simulations to the target platform such that the one or more corresponding extensions 172/182/192 are implemented in corresponding target applications 171/181/191.

FIG. 2 shows a flowchart 200 of a method for creating application extensions, according to some embodiments. The method may be implemented by a computer system such as the one described above with respect to FIG. 1. The method may also be implemented by the cloud platform 310 of FIG. 3. Furthermore, the automated extensibility framework 330 of FIG. 3 and the corresponding techniques described below provide embodiments of this method.

At 201, the method obtains one or more extension artefacts of an extension of a source application on a source system. For instance, the source analysis receptor 334 of the automated extensibility framework 330, described below with respect to FIG. 3, obtains one or more extension artefacts from one of the legacy systems 350/360, which have been analyzed by a source analyzer 351/361 and stored in an enhancement repository 352/362.

In some embodiments each of the one or more extension artefacts includes one or more identifiers, one or more fields, one or more properties, one or more labels, or one or more objects for customizing the source application. Tables 1-5 below provide examples of such.

In some embodiments the method also retrieves the one or more extension artefacts from the source system using a platform connector. For instance, the target platform 460 of FIG. 4 retrieves saved enhancement artefacts at 403 over the platform connector 470.

At 202, the method parses each of the one or more extension artefacts into a target format of a target platform based on a type of the corresponding extension artefact.

In some embodiments the parsing of each of the one or more extension artefacts based on the type of the corresponding extension artefact includes: parsing a screen enhancement type extension artefact based on a field name and a field type; parsing a user interface analysis type extension artefact based on an application identifier and an extension hook identifier; parsing a logic type extension artefact based on an object name and an object type; parsing a data dictionary type extension artefact based on a parent object, a sub-object identifier, and an object source; or parsing a source transaction type extension artefact based on a transaction identifier and an application component identifier.

Examples of extension artefacts (e.g., schema) are described below with respect to the example shown in FIG. 5.

At 203, the method identifies one or more target applications of the target platform based on an identifier of the source application. Identifying of target applications is further described below with respect to the target application identifier component 336 of FIG. 3.

In some embodiments, the identifying of the one or more target applications of the target platform is further based on an application component identifier of a corresponding extension artefact. An application component is a hierarchy of components to which an application or a software object or an integration scenario, belongs to. It is generally represented as a text identifier in the system. For example, the application component identifier of table 5 below.

At 204, the method compiles one or more extension simulations for each of the one or more the one or more target applications. Compilation is described below in further detail with respect to the application compiler 1038 of FIG. 10.

In some embodiments, the compiling of the one or more extension simulations includes converting the one or more parsed extension artefacts into the target format of a target platform.

At 205, the method provides a user interface enabling a user to select one or more selected simulations from among the one or more extension simulations. Such a user interface is described below with respect to the extension proposal visualizer 332 of FIG. 3 and the example user interface of FIGS. 12 and 13.

At 206 the method publishes the one or more selected simulations to the target platform such that the one or more corresponding extensions are implemented in corresponding target applications. For example, the extensions may be published as extensions 372/382/392 of target systems 370/380/380 shown in FIG. 3.

In some embodiments the method also identifies whether a template exists for each of the one or more target applications. In such embodiments, extensions for target applications having an existing template are created based on a pre-determined template schema and extensions for target applications not having an existing template are created based on identifying extension hooks in the corresponding extension artefact. Identification of templates is further described below with respect to FIG. 10.

Example

An example of the system and methods described above with respect to FIGS. 1 and 2 is provided below with respect to FIGS. 3-13. The example described with respect to FIG. 3-13 is one example implementation of the automated extensibility framework and other implementations and embodiments are possible. Other embodiments may use similar techniques, adapted according to the specifics of their implementation or environment.

Figure 3:
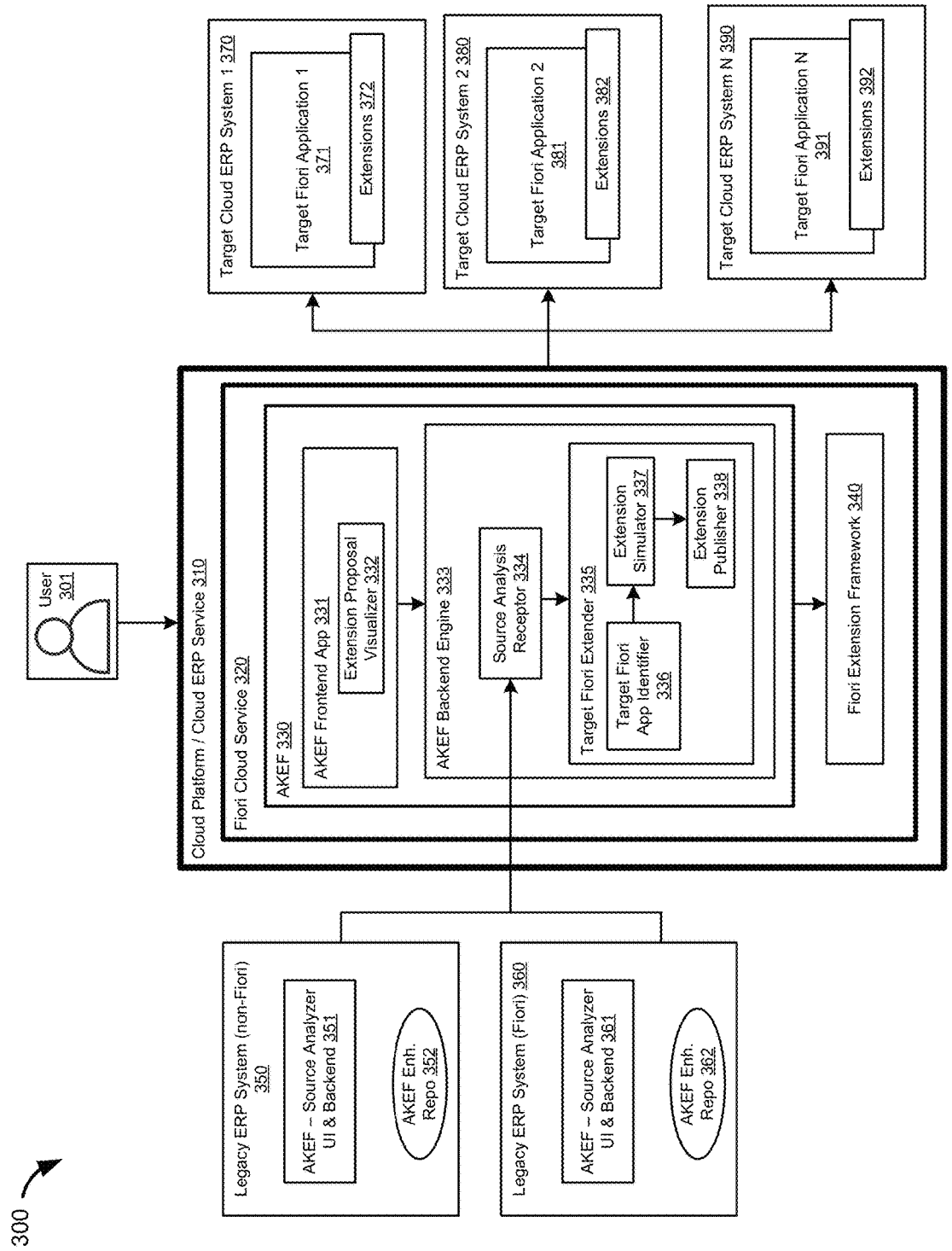
FIG. 3 shows a diagram of a system providing an automated extensibility framework that can be used to migrate an application extension from a source system to be used as an extension for a different application on a target system, according to some embodiments.

FIG. 3 shows a diagram 300 of a system 310 providing an automated extensibility framework 330 that can be used to migrate an application extension from a source system 350/360 to be used as an extension 372/382/392 for a different application 371/381/391 on a target system 370/380/390, according to some embodiments.

In this example the system 310 is a cloud platform but in other embodiments it may be a different computer system. The system 310 includes a Fiori cloud service 320 where "Fiori" refers to applications providing user interfaces, user experiences, and corresponding functionality. In other embodiments the applications may not be "Fiori" applications but may be other applications providing user interfaces, user experiences, and corresponding functionality. The Fiori cloud service 320 includes the automated extensibility framework 330. In this case it is an automated key-user extensibility framework (AKEF) as it is configured to be usable by a "key-user" 301 (e.g., an application user that is not a computer programmer or software developer). In other embodiments, the AKEF 330 may be implemented separately. That is, it may not be part of a Fiori Cloud Service 320. In some embodiments, the AFEF 330 may be deployed as a Software as a Service (Saas) offering. In other embodiments the AKEF 330 may be implemented in or integrated with a different preexisting service of a cloud platform or other computer system.

The AKEF 330 includes an AKEF frontend application 331, an AKEF backend engine 333, and a Fiori extension framework 340. The AKEF backend engine 333 includes a source analysis receptor component 334 which is configured to receive the results of source analyzer components 351/361 of legacy systems 350/360, parses the results, and store it on the target platform 310 for further processing.

The source analysis receptor component 334 can handle results from different source systems including a legacy ERP system (non-Fiori) 350 and a different legacy ERP system (Fiori) 360. Both systems include their own AKEF source analyzer user interface and backend 351/361 and their own AKEF enhancement repository 352/362. The AKEF source analyzer UI and backend 351/361 is configured to analyze the extensions on the source system. It includes a User Interface that enables the key user to input the legacy applications to be analyzed. Source Analyzer (backend) analyses the custom extensions (built by users of these source systems) built on GUI/legacy applications.

The AKEF (Backend Engine 333) Target Fiori Extender 335 component is configured to create or generate the extensions for the target application which are to be proposed to the user 301. This component includes a target Fiori application identifier 336 which is configured to identify one or more target applications (e.g., target Fiori application 371, 372, or 391), an extension simulator component 337 configured to convert artefacts from the source system into a target format, and an extension publisher component 338 which is configured to publish the application in the target system such that it is available to be used by users of the target system.

The AKEF (Frontend application 331) Extension Proposal Visualizer 332 provides a UI application that displays the generated extension proposals to the Key User 301 so that they can select the appropriate proposal and publish the same.

The Fiori Cloud service 320 includes a Fiori Extension Framework 340. This framework may be a framework for that enables users to manually create extensions. This extension framework 340 may be reused to generate the extensions automatically created based on the analysis of the AKEF 330. That is, instead of the user manually creating extensions using the framework 340, the AKEF framework 330 can automate calls to the Fiori extension framework 340 after analyzing the source extensions. The output of the framework 340 are extensions 372/382/392 created on one or multiple existing Fiori Apps 371/381/391.

Figure 4:
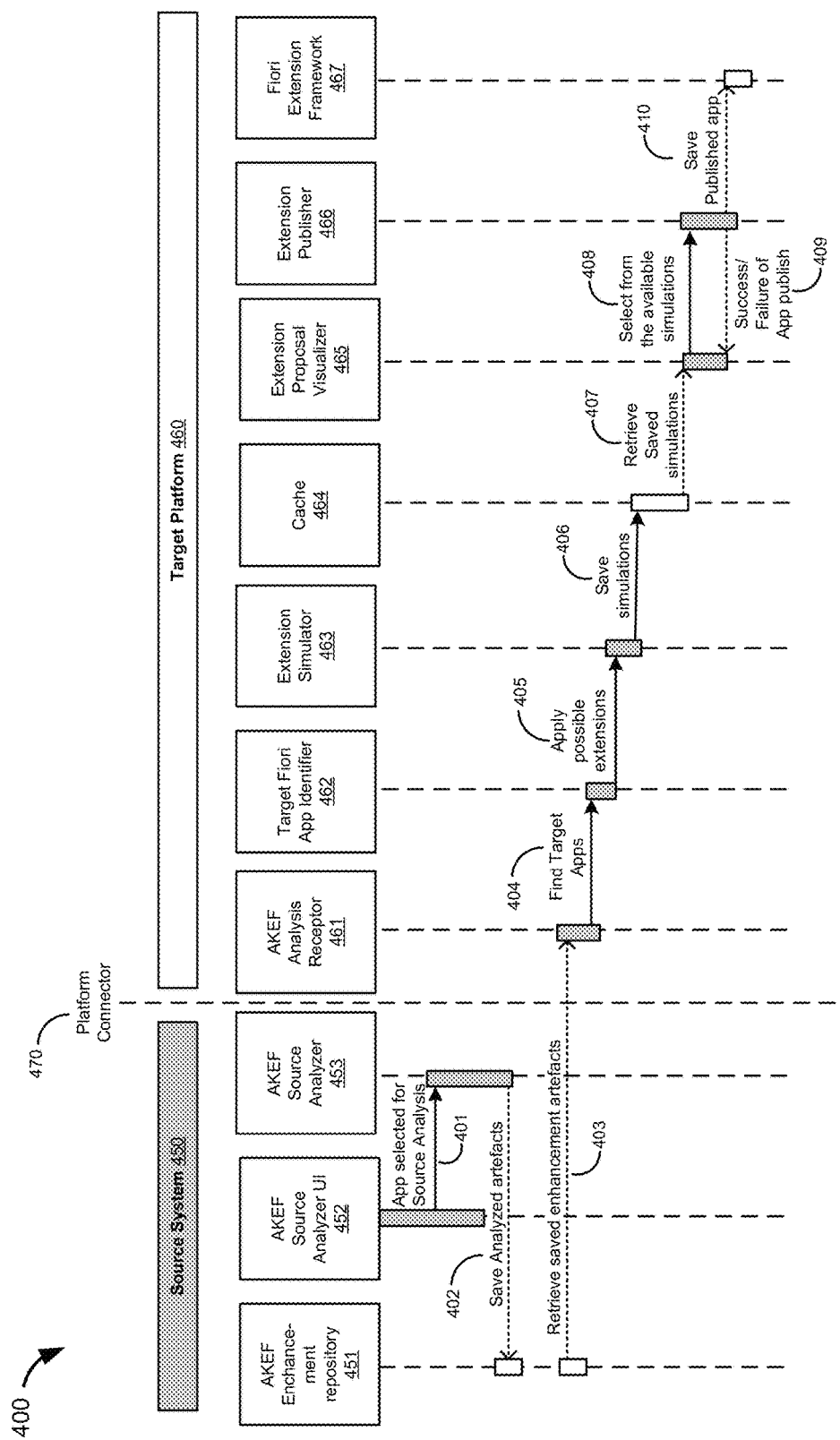
FIG. 4 shows a sequence diagram of a scenario for implementing automated extensibility techniques.

FIG. 4 shows a sequence diagram 400 of a scenario for implementing automated extensibility techniques. The processes shown in this diagram 400 may be implemented by the AKEF and the source systems described above with respect to FIG. 3. The diagram 400 includes a source system 450, a target platform 460, and a platform connector 470 communicatively coupling the source system 450 and the target platform 460 (e.g., a network connection).

The source system 450 includes an AKEF enhancement repository 451, an AKEF source analyzer UI component 452, and an AKEF source analyzer component 451. The target platform 460 includes an AKEF analysis receptor component 461, a target Fiori application identifier component 462, an extension simulator component 463, a cache 464, an extension proposal visualizer component 465, an extension publisher component 466, and a Fiori extension framework component 467. These components of FIG. 4 may be configured similar to the corresponding components described above with respect to FIG. 3.

At 401, an application is selected for source analysis by a user of the AKEF source analyzer UI 452 of the source system 450.

At 402, artefacts that have been analyzed by the AKEF source analyzer 453 are saved into the AKEF enhancement repository 451.

At 403, these saved enhancement artefacts are retrieved from the enhancement repository 451 by the AKEF analysis receptor 461 of the target platform 460.

At 404, the AKEF analysis receptor 461 provides the artefacts to the target Fiori application identifier 462 and requests it to find (identify) target applications.

At 405, the target Fiori application identifier component 462 provides the target applications that it has identified to the extension simulator component 463 and requests it to apply the possible extensions (determined by the AKEF analysis receptor 461) to the identified target applications.

At 406, the extension simulator saves the extensions to the cache 464.

At 407, the extension proposal visualizer 465 retrieves the saved simulations from the cache 464.

At 408, a user selects from the available simulations and the selected extensions are provided to the extension publisher 466.

At 409, the extension publisher 466 publishes the application and notifies the extension proposal visualizer 465 of the success/failure of the application publish.

At 410, the extension publisher 466 saves the published application to the Fiori extension framework 467.

Figure 5:
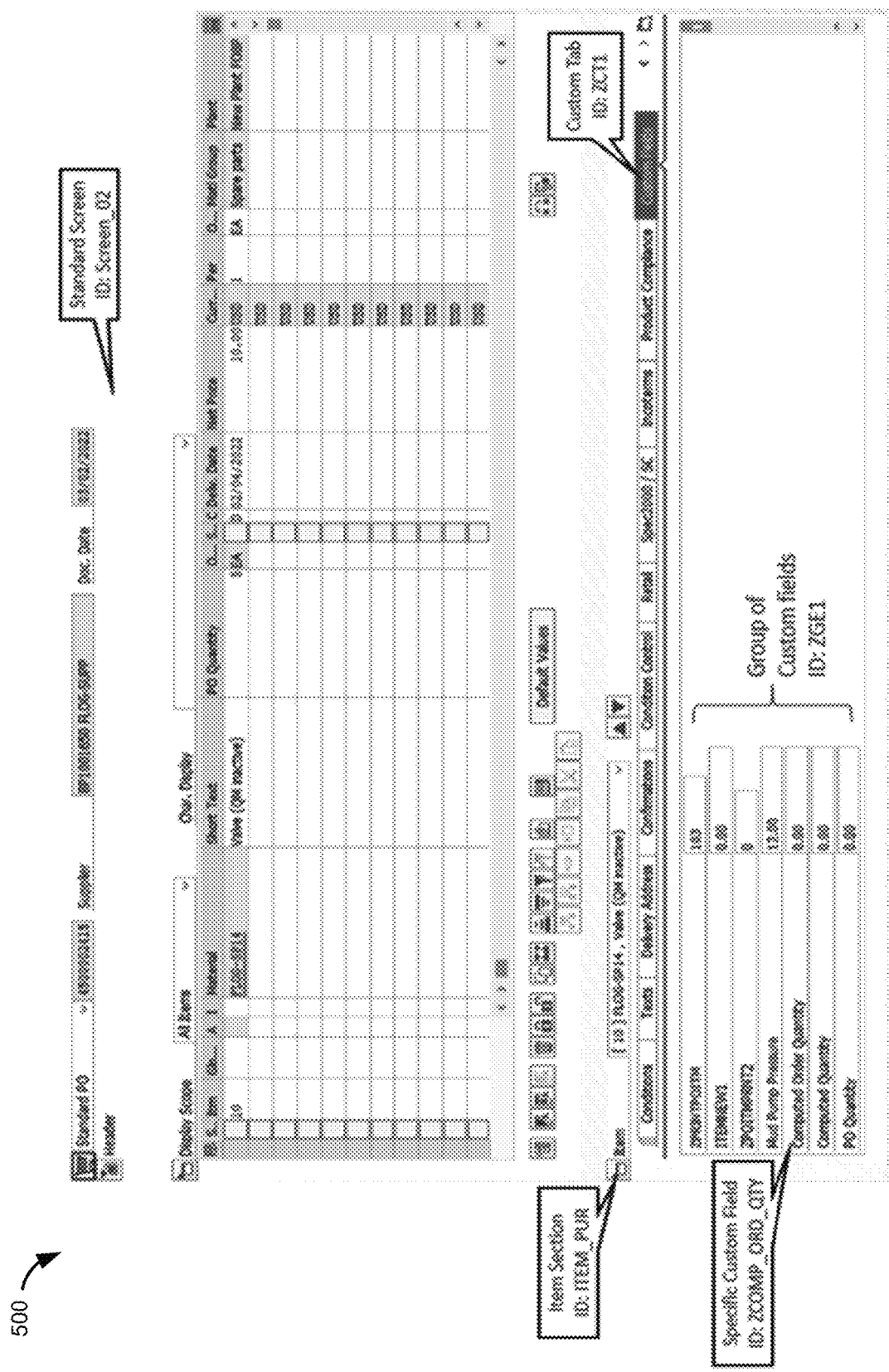
FIG. 5 shows a user interface of an application including a custom tab and custom fields provided by an extension, according to some embodiments.

Now a description of the artefacts in the source system is provided along with an example of an extension shown in FIG. 5. At the source system, in general, there are legacy applications, sometimes built on generic UI methodologies. As mentioned above, these legacy applications often have several Extensions. The proposed framework includes an AKEF Source Analyzer component, which analyses the source application for existing extensions, as mentioned above. Further details and an example are provided below.

Examples of extensions for various applications saved in the source system include GUI based extensions such as database fields (in the form of append structures, that is, a structure appended to another structure or database table which appends their components to them to insert new components, define foreign keys, etc.), screen enhancements (in the form of group of visible fields in the application), custom logic enhancements in the form of BADI (e.g., a "Business Add-In"), etc.; and Fiori based extensions such as extend structures for the database tables, custom structures added as entity in OData service projects, UI enhancements (like fragments, custom dialogs, custom UI validations, fields etc.), legacy Fiori key user extensions (like append structures, custom logic in terms of BADI, key user extensibility enabled fields on the application), etc. The AKEF Source Analyzer component (e.g., 351/361 of FIG. 3) is configured to analyze the above-mentioned artefacts for its availability with respect to a given application that is input by user.

FIG. 5 shows a user interface 500 of an application including a custom tab and custom fields provided by an extension, according to some embodiments. The example of FIG. 5 shows "ME21n—Create Purchase Order," which is a GUI transaction/Application that is available in the source system. In this example, several extensions have been performed (created) by a key-user at the customer end which exists in the source system. Types of extensions performed by the customer for this application are as follows:

Purchase order table EKPO is enhanced with fields as Field A, Field B, Field C. This exists as an Append structure in the system.

A BADI (add-in) that the customer implemented to have custom logic to validate and process the additional fields added by them.

A screen enhancement in the application, where a separate Tab is created to add all new fields Field A, Field B, Field C.

In one example scenario, the user of the application wishes to migrate to a certain target system (e.g., a Cloud Platform such as the one described with respect to FIG. 3). The proposed framework provisions the key-user with a Source Analyzer UI (e.g., 351/361). The user can select the applications to be analyzed or extended on this UI and trigger the analysis.

AKEF Source analyzer (e.g., 351/361) scans the artefacts around the "ME21n" application for the available extensions in the source system. The artefacts are as highlighted in the above listed points—the append structure, the BADI and the GUI Screen enhancement tab.

The source analyzer is configured for extracting the information of these objects and saving them in the AKEF Enhancement Repository (e.g., 352/362). The AKEF Enhancement Repository stores these analyzed artefacts in a set of tables as follows:
1. Screen Enhancement Analysis Schema
2. UI Analysis Schema
3. Business Logic Analysis Schema
4. Enhanced DDIC Analysis Schema
5. Source Transaction Details Schema Examples of these schema and further description are provided below.

Screen Enhancement Analysis Schema

An example screen enhancement schema may store values shown in table 1 (below) corresponding to the screen shown in FIG. 5.

TABLE 1

| | | | | | | | | |
|---|---|---|---|---|---|---|---|---|
| Screen Enhancement Schema | | | | | | | | |
| Screen Enhancements Schema | | | | | | | | |
| Field Name | Field Type | Field Property | Field label | Header Object | Sub Object 1 | Sub Object 2 | Sub Object 3 | Sub Object 4 |
| ZCOMP_ORD_QTY | Input | Editable | Computed Order Quantity | SCREEN_02 | ITEM_PUR | ZCT1 | ZGE1 | ZCOMP_ORD_QTY |

UI Analysis Schema

If the key user selects a legacy application at the source system to be migrated with extensions to the Target System, the following example schema in table 2 may store the analysis of the extension hooks.

TABLE 2

| | | |
|---|---|---|
| UI Analysis Schema | | |
| UI Analysis Schema | | |
| App ID (Char 4) | App Name (Char 30) | Extension View Hook ID (Char 20) |
| App ID (Char 4) | App Name (Char 30) | Extension Controller Hook ID (Char 20) |

Business Logic Analysis Schema

The Business Logic related artefacts are scanned using existing database tables providing details of the artefacts needed by the AKEF analyzer.

These tables store the enhancement details specific to the customer/partner extensions. These are extracted for the application that is selected for migration to the target platform.

TABLE 3

| Business Logic Schema | | | |
|---|---|---|---|
| Business Logic Schema | | | |
| Standard Object Name (Char 60) | Object Type (Char 20) | Custom Object Name | Object Source (Original System) (Char 10) |
| e.g., BADI_PO_QTY_VALIDATION | BADI | ZCL_PO_QTY_VALIDATION | XYZ |

Enhanced DDIC Analysis Schema

The following table 4 shows a data dictionary (DDIC) analysis schema.

TABLE 4

| Enhanced DDIC Schema | | |
|---|---|---|
| Enhanced DDIC schema | | |
| Parent DDIC Object ID (Char 60) | Sub-object DDIC Object ID (Char 20) | DDIC Object Source (Original System) (Char 10) |
| For e.g., EKPO | ZEKPO_CUST_APPEND | XYZ |

Source Transaction Details Schema

The following table 5 shows a source transaction details schema.

TABLE 5

| Source Transaction Details Schema | | | |
|---|---|---|---|
| Source Transaction Details Schema | | | |
| Transaction ID (Char 4) | Transaction Name (Char 30) | Package Name | Application Component ID |
| For e.g., ME21n | Create Purchase Order | ME | MM-PUR |

The schema discussed above are examples of analyzed artefacts that may be stored by the source system in an enhancement repository and then retrieved by a source analysis receptor component of an AKEF backend of the target platform. The further processing that is performed by the AKEF of the target platform is described below.

Figure 6:
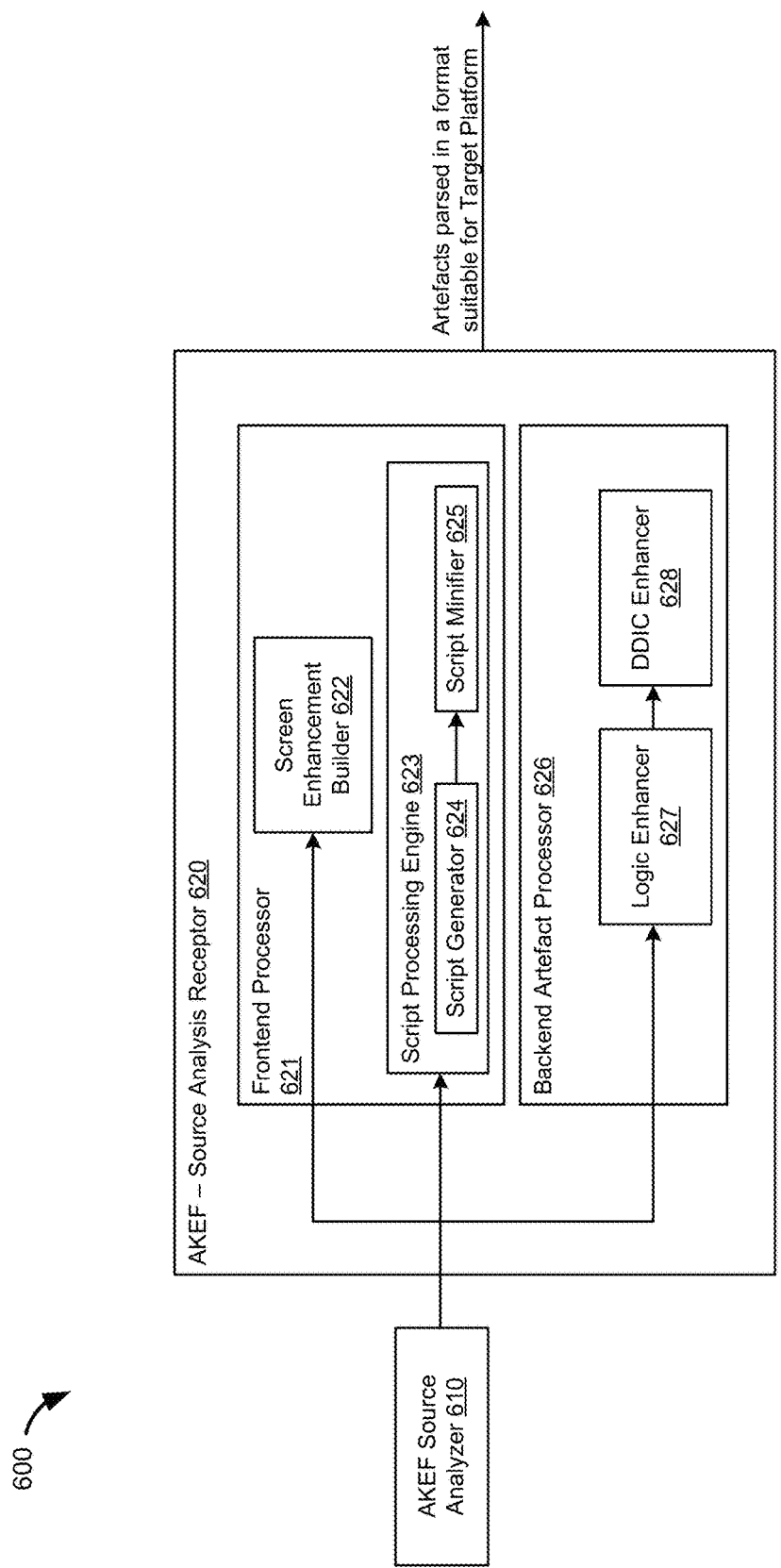
FIG. 6 shows a diagram of source analysis receptor components, according to some embodiments.

FIG. 6 shows a diagram 600 of source analysis receptor 620 components, according to some embodiments. The source analysis receptor 620 includes a frontend processor 621 and a backend artefact processor 626.

The frontend processor 621 is configured for processing the info stored in the Screen Enhancement Repository. The frontend processor 621 includes a screen enhancement builder component 622 and a script processing engine component 623. The script processing engine component 623 includes a script generator 624 and a script minifier component 625.

The backend artefact processor 626 is configured for processing objects saved in the AKEF Enhancement Repository 352, 362 depicted in table 3 and table 4.

The backend artefact processor 626 includes a business logic enhancer 627 and a DDIC enhancer 628.

Artefacts received from an AKEF source analyzer 610 of a source system are provided to the screen enhancement builder 622, the script processing engine 624, the business logic enhancer 627 and are used to generate artefacts parsed in a format suitable for the target platform as output.

The script processing engine 623 and logic enhancer 267 are described in further detail below.

Figure 7:
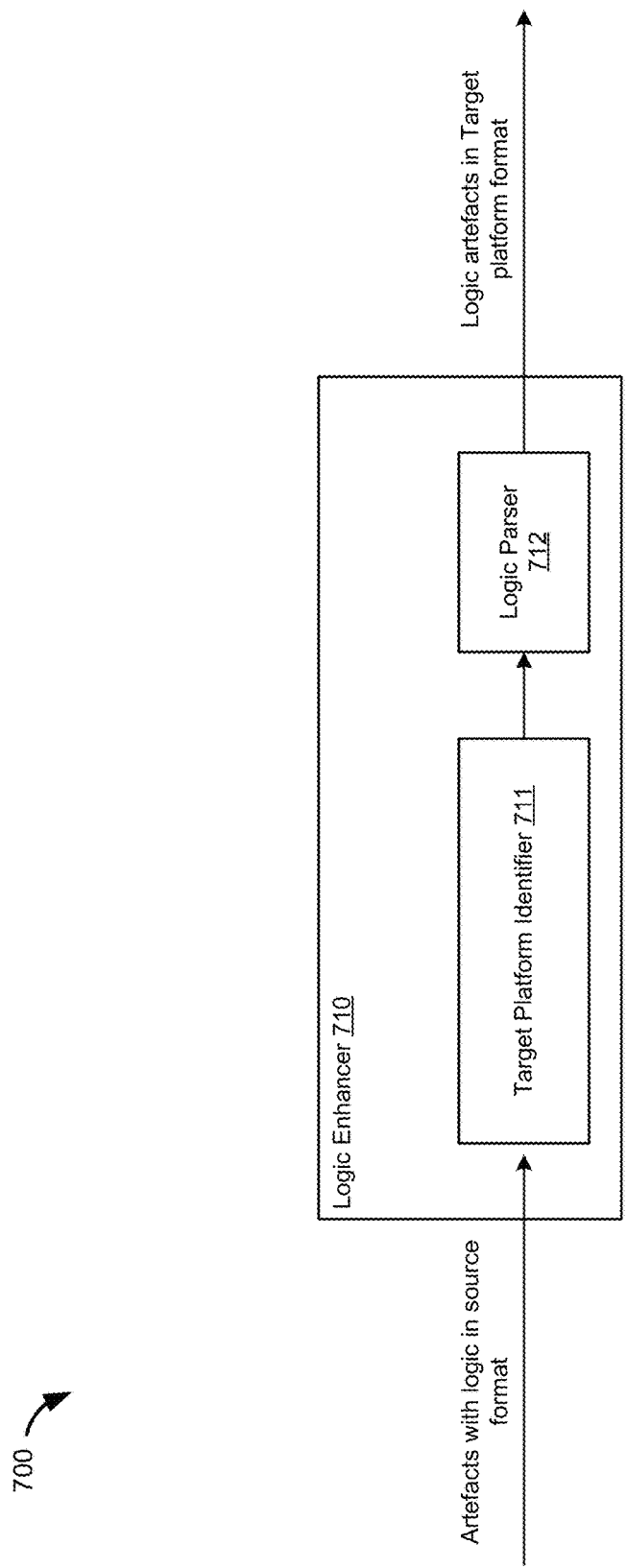
FIG. 7 shows a diagram of logic enhancer components, according to some embodiments.

FIG. 7 shows a diagram 700 of logic enhancer 710 components, according to some embodiments. The logic enhancer 710 of FIG. 7 corresponds to the logic enhancer 627 of FIG. 6. The logic enhancer 710 includes a target platform identifier 711 and a logic parser 712. The logic enhancer 710 receives artefacts with logic in a source format and outputs logic artefacts in the target platform format.

Add-ins (e.g., BADI) for which there is a custom enhancement in the source system may be processed by the logic enhancer 710. The logic enhancer 710 is configured to process the logic available in the source (legacy) system, parse it, and enable the same logic in the target platform format. The target platform identifier 711 is configured to identify the target format for the logic. The logic parser 712 is configured to parse and enable the legacy code in the target format. In some embodiments, an existing tool or framework within the target platform may be used to provide mechanisms to enable custom backend logic on target cloud platform.

Referring back to FIG. 6, the available field enhancements that are returned by the AKEF source analyzer (e.g., in the form of Append structure) is processed by the DDIC enhancer 628. The DDIC enhancer 628 is configured for adjusting the database in the target platform with respect to the available enhancements in the source platform.

Still referring to FIG. 6, the results from the AKEF Source Analyzer that are related to the screen enhancements (e.g., enhanced Tab on the screen shown in FIG. 5) are passed on to the screen enhancement builder 622. The screen enhancement builder is configured for building the metadata required to adjust the applications available at the Target Platform.

Figure 8:
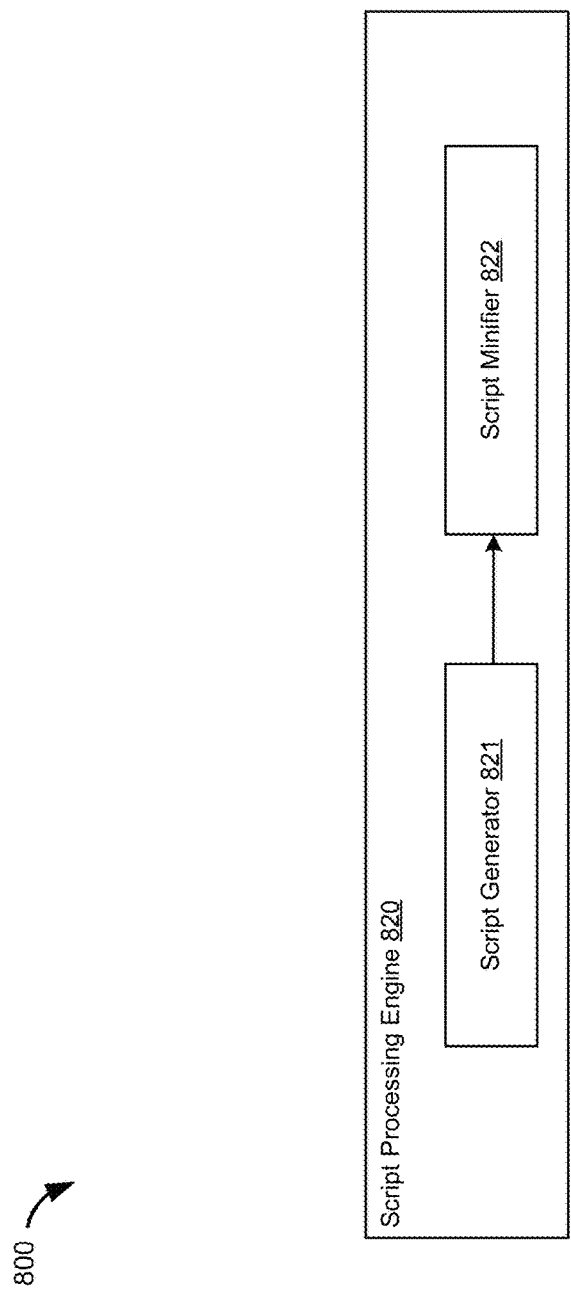
FIG. 8 shows a diagram of a script processing engine, according to some embodiments.

The script processing engine 623 of FIG. 6 is now described in further detail below with respect to FIG. 8 and FIG. 9. FIG. 8 shows a diagram 800 of a script processing engine 820, according to some embodiments. The AKEF Script Processing engine 820 is configured for processing UI info coming from the Source Analyzer. In this example (e.g., the enhancements shown in FIG. 5), the UI related metadata and properties are stored by the source analyzer in the screen enhancement schema (described in Table 1 above). Considering that the target platform is typically more advanced and up-to-date compared to the legacy platforms, the script processing engine 820 analyses the available metadata properties from the repository and generates a possible script that could be applied in the target platform.

Figure 9:
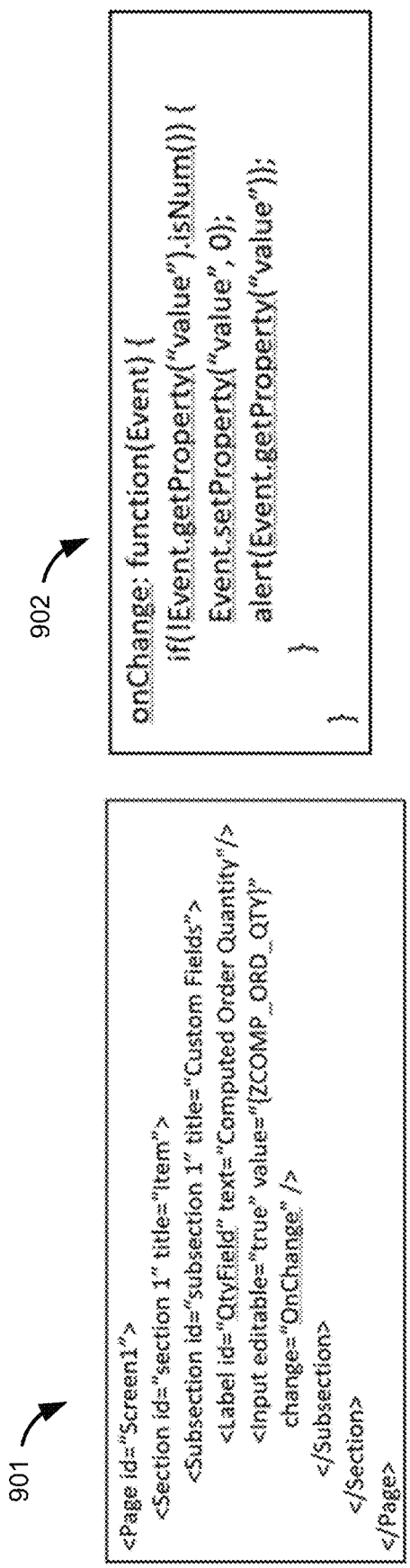
FIG. 9 shows a diagram of an example generated script and an example script output, according to an embodiment.

FIG. 9 shows a diagram 900 of an example generated script 901 and an example script output 902, according to an embodiment. The script 901 is example of a script generated from the script processing engine 820 of FIG. 8 based on the "ME21n" example shown in FIG. 5.

The script generator 821 of FIG. 6 is configured to translate the available metadata properties and creates a hierarchy view based on the available information. The script generation may be performed based on an html (or generic markup) and/or JavaScript (or generic Scripting language). The generated script 901 is an example of the output generated by the script generator 821 of FIG. 8.

The script minifier 822 of FIG. 8 is configured for minifying these results to compress them and store in the file system format.

Referring back to FIG. 3, the components described with respect to FIG. 6-8 were components of the source analysis receptor component 334 of the AKEF backend engine 333 of the AKEF 330 shown in FIG. 3. As shown in FIG. 3, the output of the source analysis receptor 334 (e.g., extensions in the target format) are provided to the target Fiori extender component 335 of FIG. 3.

The target Fiori extender 335 is configured for extending/proposing extensions at the Target Platform. The target Fiori extender 335 includes a target Fiori application identifier 336, an extension simulator 337, and an extension publisher 338. In the example of FIG. 5, where the key-user wishes to extend/migrate the extensions of the GUI transaction "ME21n", the Target Fiori App finder is responsible for finding the applications that are to be extended in the target platform.

The target Fiori application identifier 336 of the target Fiori extender 335 takes as an input from the source analysis receptor the name of the source application to be extended/migrated with extensions (e.g., the "ME21n" application shown in FIG. 5). The source analysis receptor sends, along with this application name information, the 'Application component' (also called Application Component Hierarchy (ACH)) related details which is depicted as part of the Source Transaction Details schema. For example, "ME21n" is a GUI transaction named "Create Purchase Order" which is available in the application component "MM-PUR" as shown in table 5 above.

Each application in the Target platform may have an association with a business object. A business object can be a real-world business entity like Purchase Order, Business Partner, Product etc. modelled as a software object in the considered system. This information may be stored in the repository as follows:

TABLE 6

Business Object mapping
Business Object Mapping Schema

| App ID (Char 4) | App Name (Char 30) | Business Object ID (Char 30) | Business Object Description (Char 60) | Application Component |
|---|---|---|---|---|
| For e.g., F2626 | Manage Purchase Order | PurchaseOrder | Purchase Order Processing | MM-PUR |

The target Fiori application finder 336 may use the details from the Source Transaction details Repository passed by the Source Analysis Receptor 334 to identify the relevant applications in the Target Platform 310 by means of the application component (see Table 6 above). This can result in one or several apps, out of a number of apps hosted in the target platform. In the GUI application "ME21n" example, the corresponding apps found by the Target app finder based on the Application component "MM-PUR" are:
Manage Purchase Order (App ID—F2626)
Purchase Order Overview (App ID—F2627)

The Extension proposal visualizer may also have an option to filter the applications based on the object type, so the key-user can view the simulations for the required applications per object. The Target App details are then passed onto the extension simulator 337.

Figure 10:
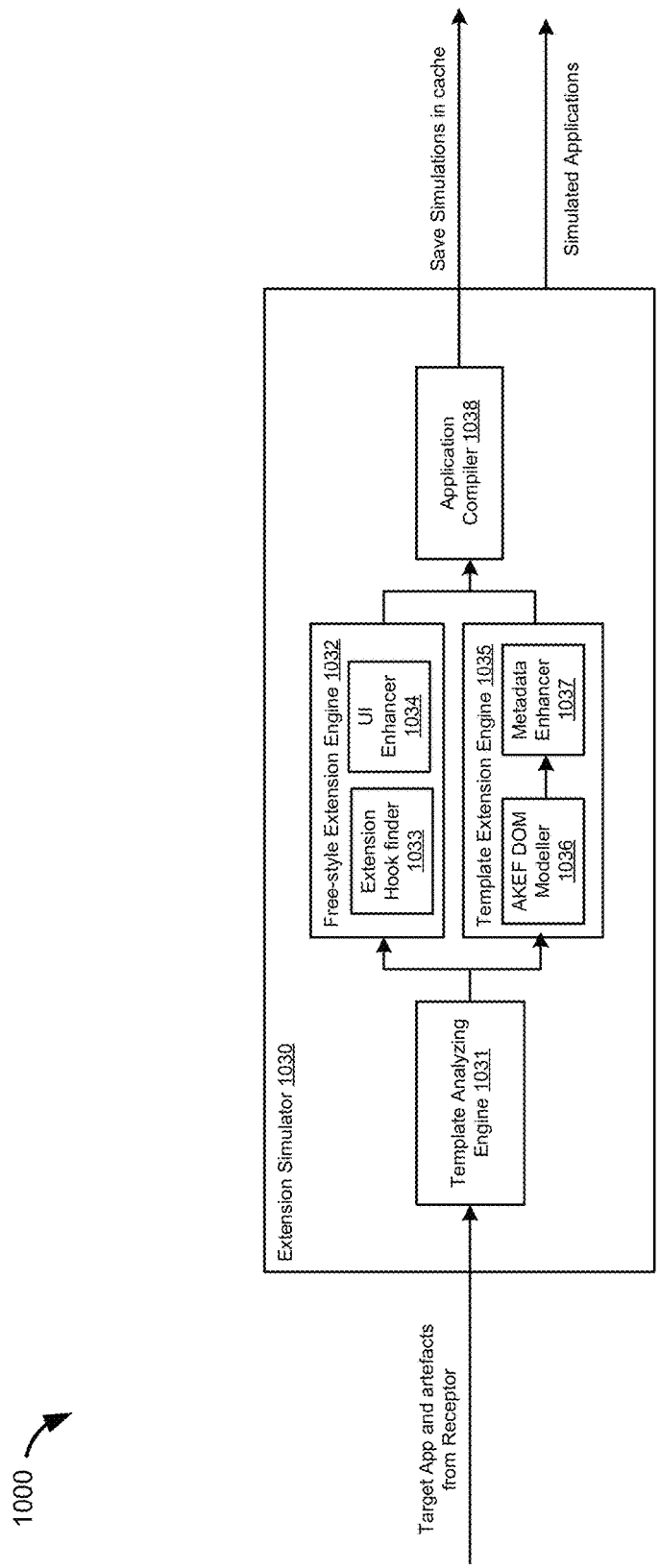
FIG. 10 shows a diagram of extension simulator components, according to some embodiments.

The extension simulator 337 of the target Fiori extender 335 of FIG. 3 is now described with respect to FIG. 10. FIG. 10 shows a diagram 1000 of extension simulator 1030 components, according to some embodiments. The extension simulator 1030 includes a template analyzing engine 1031, a free-style extension engine 1032, a template extension engine 1035, and an application compiler 1038.

The extension simulator 1030 receives the artefacts from the source system converted into target format by the source analysis receptor 334, and ready to be applied in the target applications identified by the target application identifier 336.

There may be a range of available applications where extensions can be applied using the artefacts. The extension simulator is configured to provision the key user with one or more possible extension simulations that can be automated on the available range of applications in the Target Platform.

An application may be designed using a "template" or framework for generating the user interface (e.g., a template for a list or report, a template for object details, etc.). The template analyzing engine 1031 is configured to determine the template that the Target Application is built on. For applications using templates, determination of which templates are used may be performed using an identifier. In some embodiments, determination of the template may be specific to the particular implementation. As one example, if the target platform is a cloud platform, and the target application to be extended is a "Manage Purchase Order" Fiori Application, the following describes how AKEF determines the floorplan details (e.g., the layout and size of the header, content, footer, etc. of a web user interface): Query on an already existing table, with the Fiori Application ID shall fetch the details of the template. In this case, it is "List Report" template floorplan. In other embodiments, determination of any template may be performed differently.

Templates for other target applications may be different and may be application specific.

If the template details are found by template analyzing engine 1031, the template analyzing engine 1031 forwards the results of the receptor 334 to the template extension engine 1035. If no template is found the template analyzing engine 1031 forwards the results of the receptor 334 to the free-style extension engine 1032.

The template extension engine 1035 extends the applications that are based on the available templates of the UI methodology. Further, template extension engine 1035 may include a table with pre-delivered content. An example of this table follows:

TABLE 7

Template Schema with pre-delivered content
AKEF_EXT_SIM

| Template ID | Template Name | Extension Type | Extension Description |
|---|---|---|---|
| Temp_001 | List Report Template | Ext_001 | Extend filters only |
| Temp_001 | List Report Template | Ext_002 | Extend filters and List Table with fields only |
| Temp_001 | List Report Template | Ext_003 | Extend List Table only |

TABLE 7-continued

Template Schema with pre-delivered content
AKEF_EXT_SIM

| Template ID | Template Name | Extension Type | Extension Description |
|---|---|---|---|
| Temp_001 | List Report Template | Ext_004 | Extend filters, List Table and Object Page with fields |
| ... | ... | ... | ... |
| Temp_N | <N> Template | Ext_N | <Description N> |

This table may be updated with a new release of a UI patch.

The template extension engine 1035 may generate one proposal per extension type, maintained in the AKEF_EXT_SIM table against the template ID for example.

Referring back to the example shown in table 6, the target Fiori application "Manage Purchase Order" is built on the "List Report Floorplan." If the template type List Report has 4 extension types, which may be pre-maintained in the AKEF_EXT_SIM table, then Template Extension engine may provide 4 proposal simulations.

The template extension engine 1035 further consists of an AKEF Document Object Model (DOM) Modeler component 1036 which may be configured to use the screen enhancement schema to enhance the DOM model of the application. The DOM is an interface used to access XML documents based on an object-oriented tree-like representation of the documents in the memory, where each node is represented by an object.

Since applications that are template-based may be mostly built on metadata, the template extension engine 1035 includes a metadata enhancer component 1037 which is configured to enhance the metadata of the target application based on the info available in the screen enhancement schema. These enhancements may be achieved based on execution of the extension framework 340.

The free-style extension engine 1032 is configured to take the results from the script processing engine 820 and apply them. This uses two modules: the extension hook finder module 1033 and the UI enhancer module 1034.

UI applications that are extensible may consists of exits (called extension hooks) where code can be plugged in. The extension hook finder 1033 is configured for finding these extension hooks in the target application and providing this information to the UI enhancer 1034.

The UI enhancer 1034 is configured to use the details provided by extension hook finder 1033 to extend the UI by adding the enhanced scripts. The enhancement logic is taken from the script processing engine 820 in the Source Analysis Receptor 334.

The application compiler 1038 is configured for compiling the proposed simulations and storing them in a cache. The application compiler 1038 compiles simulations generated by the AKEF simulator 337. When the key-user selects one of those available simulations to be published, the extension publisher 338 of the target Fiori extender 335 publishes the application in the target system.

Figure 11:
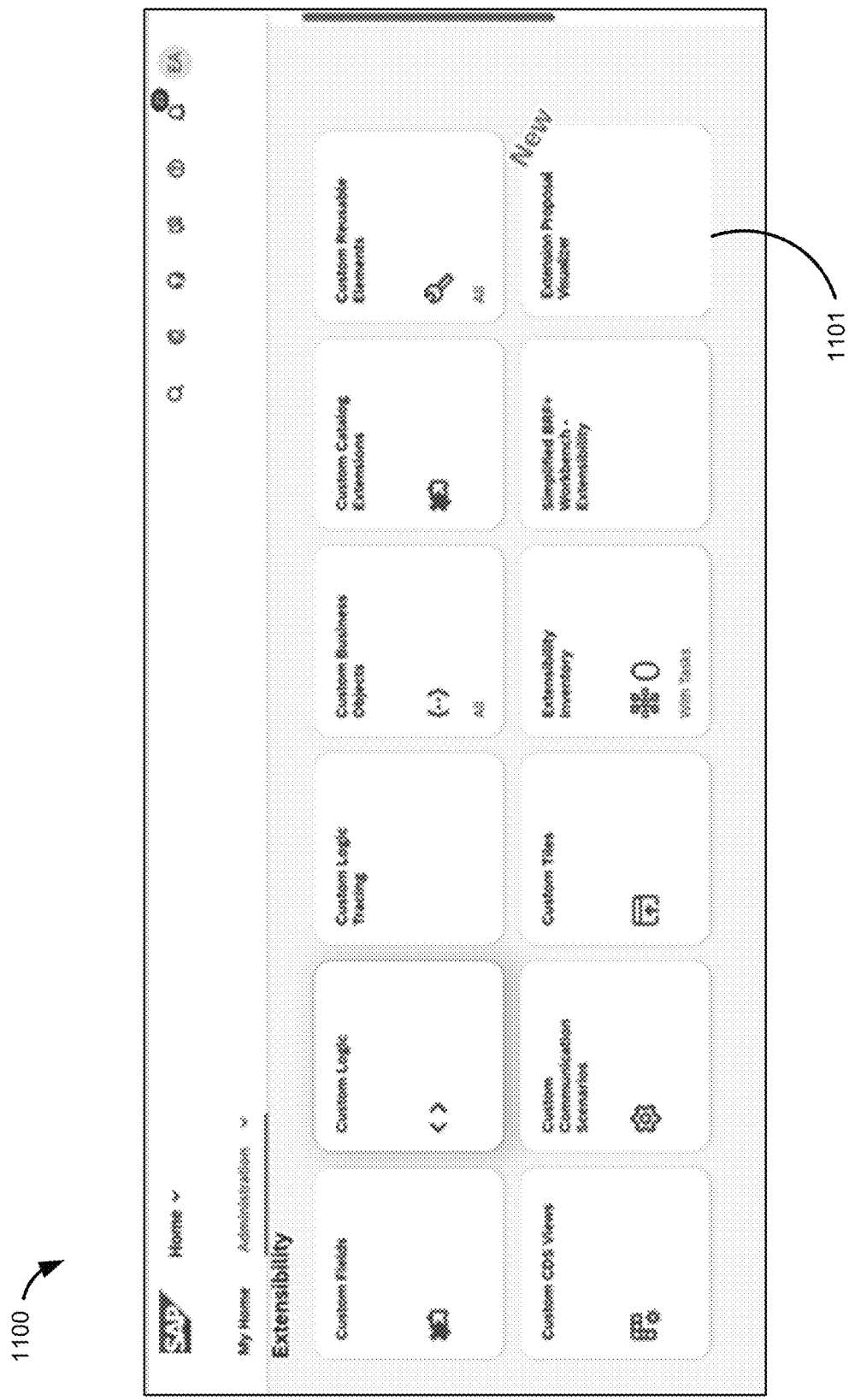
FIG. 11 shows an extensibility administration user interface including an extension proposal visualizer component, according to some embodiments.

FIG. 11 shows an extensibility administration user interface 1100 including an extension proposal visualizer component, according to some embodiments. This user interface 1100 enables the user to create custom fields, custom logic, custom logic tracing, etc., and also enables the user to review the proposed extensions that were automatically created using an "extension proposal visualizer" (the extension proposal visualizer 332 of FIG. 3).

Figure 12:
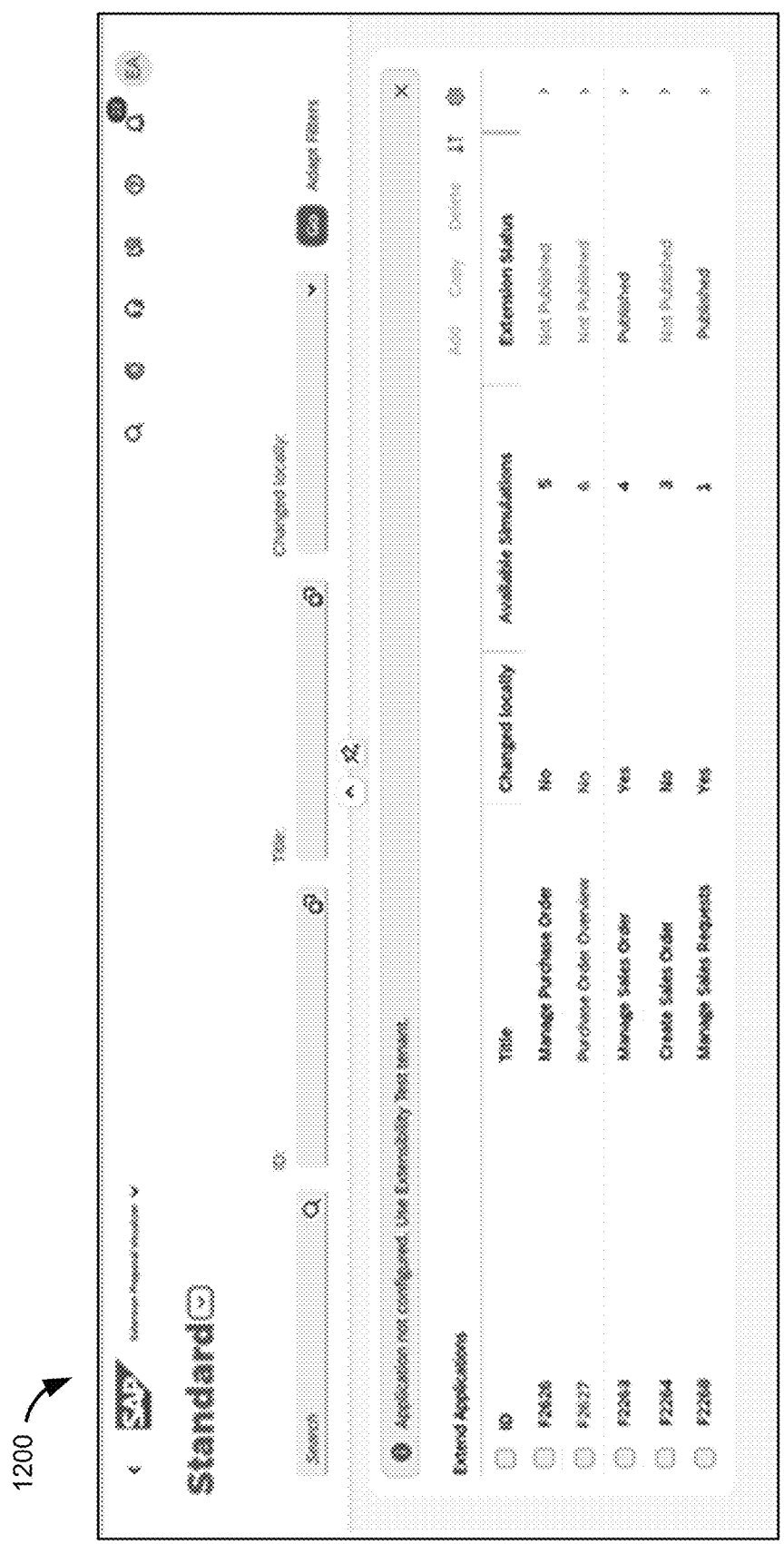
FIG. 12 shows an extension proposal visualizer user interface according to some embodiments.

FIG. 12 shows an extension proposal visualizer user interface 1200 according to some embodiments (the extension proposal visualizer 332 of FIG. 3). This example shows 5 applications that can be extended, each with one or more available simulations. One of the applications is ID F2626 having a title of "Manage Purchase Order."

Figure 13:
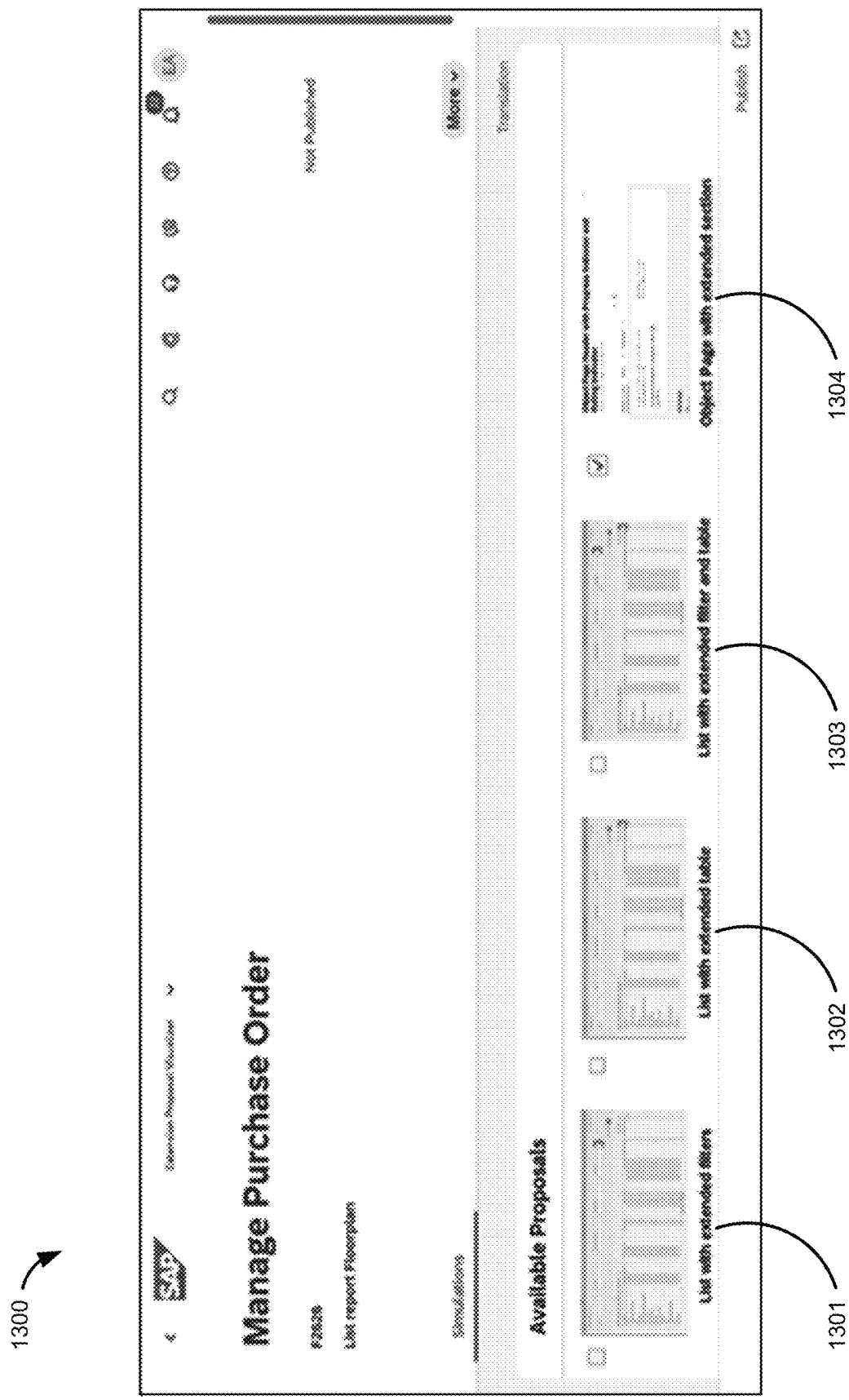
FIG. 13 shows a user interface with proposed extensions for an application, according to some embodiments.

FIG. 13 shows a user interface 1300 with proposed extensions for an application, according to some embodiments. This user interface 1300 shows the proposed extensions for the application having ID F2626 and title of "Manage Purchase Order" shown in FIG. 12. In this example, 4 proposed extension simulations are shown, a list with extended filters 1301, a list with extended table 1302, a list with extended filter and table 1303, and an object page with extended section 1304.

Figure 14:
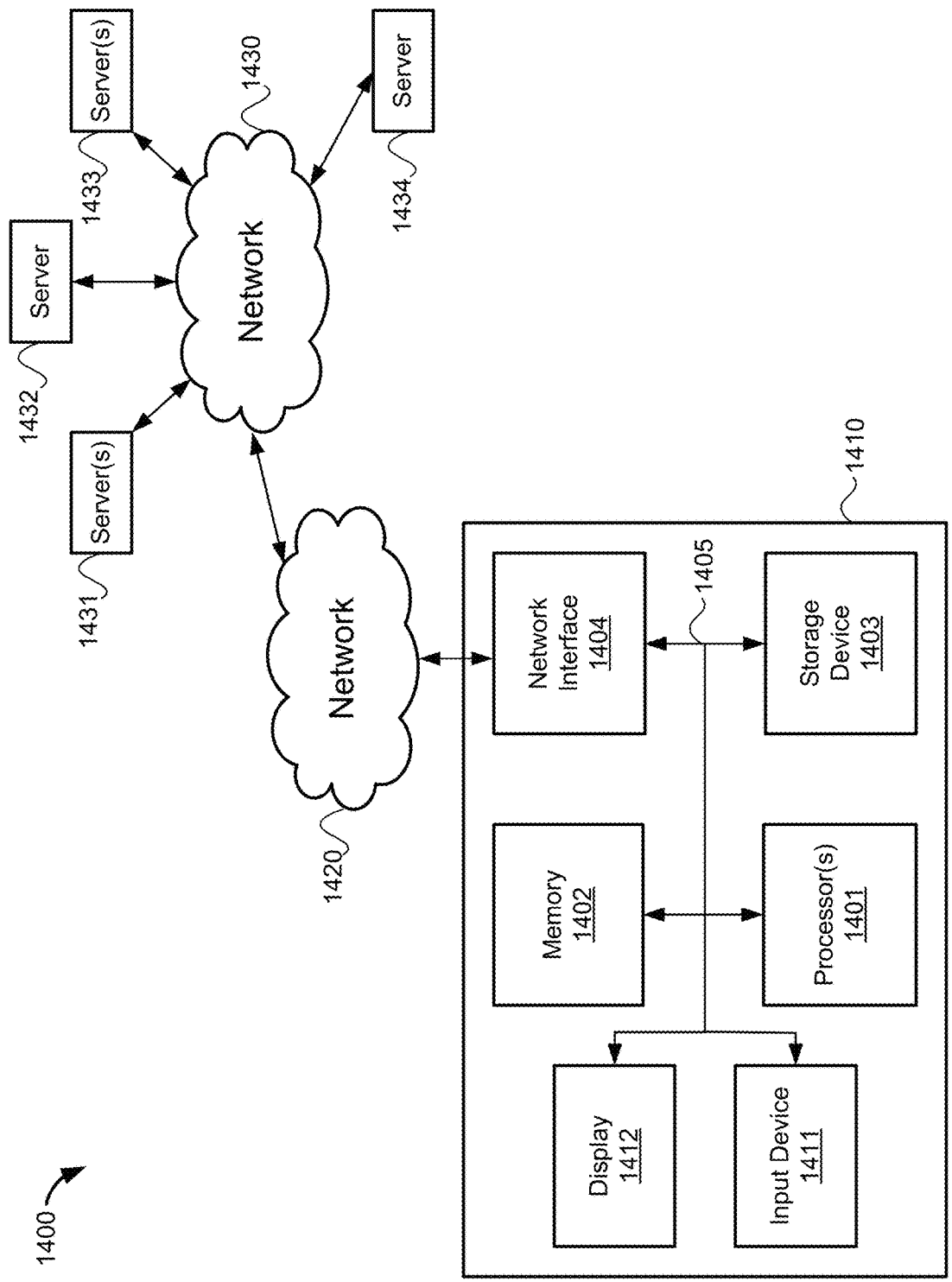
FIG. 14 shows a diagram of hardware of a special purpose computing machine for implementing systems and methods described herein.

The user can select a particular proposal to review it and publish it for use by other users if desired. Thus, extensions of a source application on a source system can be automatically analyzed and parsed to create corresponding extensions for one or more target applications on the target platform. The automated key-used extension framework provides advantages over prior systems in that it enables a key-user (e.g., not a computer programmer or software developer) to be presented with proposed extensions to implement on a target system without needing to manually analyze the source application and then manually create extensions for the target system one by one. Furthermore, this automated key-user extension framework may be used whenever the platform is upgraded (for instance, upgraded from an on-premise deployment to cloud based deployment) or when platforms are being migrated Example Hardware FIG. 14 shows a diagram 1400 of hardware of a special purpose computing machine for implementing systems and methods described herein. The following hardware description is merely one example. It is to be understood that a variety of computers topologies may be used to implement the above described techniques. The hardware shown in FIG. 14 may be used to implement the computer systems and computer software (computer program code) described herein.

The computer system 1410 includes a bus 1405 or other communication mechanism for communicating information, and one or more processor(s) 1401 coupled with bus 1405 for processing information. The computer system 1410 also includes a memory 1402 coupled to bus 1405 for storing information and instructions to be executed by processor 1401, including information and instructions for performing some of the techniques described above, for example. This memory may also be used for storing programs executed by processor(s) 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1403 may include source code, binary code, or software files for performing the techniques above, for example. Storage device and memory are both examples of non-transitory computer readable storage mediums.

The computer system 1410 may be coupled via bus 1405 to a display 1412 for displaying information to a computer user. An input device 1411 such as a keyboard, touchscreen, and/or mouse is coupled to bus 1405 for communicating information and command selections from the user to processor 1401. The combination of these components allows the user to communicate with the system. In some systems, bus 1405 represents multiple specialized buses, for example.

The computer system also includes a network interface 1404 coupled with bus 1405. The network interface 1404 may provide two-way data communication between computer system 1410 and a network 1420. The network interface 1404 may be a wireless or wired connection, for example. The network 1420 may be a local area network or an intranet, for example. The computer system 1410 can send and receive information through the network interface 1404, across the network 1420, to computer systems connected to the Internet 1430. Using the Internet 1430 the computer system 1410 may access data and features that reside on multiple different hardware servers 1431-1434. The servers 1431-1434 may be part of a cloud computing environment in some embodiments.

Example Embodiments

Various example embodiments implementing the techniques discussed above are described below.

Some embodiments provide a computer system. The computer system comprises one or more processors and one or more machine-readable medium coupled to the one or more processors. The one or more machine-readable medium storing computer program code comprising sets instructions. The sets of instructions executable by the one or more processors to obtain one or more extension artefacts of an extension of a source application on a source system. The sets of instructions further executable by the one or more processors to parse each of the one or more extension artefacts into a target format of a target platform based on a type of the corresponding extension artefact. The sets of instructions further executable by the one or more processors to identify one or more target applications of the target platform based on an identifier of the source application. The sets of instructions further executable by the one or more processors to compile one or more extension simulations for each of the one or more the one or more target applications. The sets of instructions further executable by the one or more processors to provide a user interface enabling a user to select one or more selected simulations from among the one or more extension simulations. The sets of instructions further executable by the one or more processors to publish the one or more selected simulations to the target platform such that the one or more corresponding extensions are implemented in corresponding target applications.

In some embodiments of the computer system, each of the one or more extension artefacts includes one or more identifiers, one or more fields, one or more properties, one or more labels, or one or more objects for customizing the source application.

In some embodiments of the computer system, the parsing of each of the one or more extension artefacts based on the type of the corresponding extension artefact includes: parsing a screen enhancement type extension artefact based on a field name and a field type; parsing a user interface analysis type extension artefact based on an application identifier and an extension hook identifier; parsing a logic type extension artefact based on an object name and an object type; parsing a data dictionary type extension artefact based on a parent object, a sub-object identifier, and an object source; or parsing a source transaction type extension artefact based on a transaction identifier and an application component identifier.

In some embodiments of the computer system, the identifying of the one or more target applications of the target platform is further based on an application component of a corresponding extension artefact.

In some embodiments of the computer system, the computer program code further comprises sets instructions executable by the one or more processors to identify whether a template exists for each of the one or more target applications. In such embodiments, extensions for target applications having an existing template are created based on a pre-determined template schema and extensions for target applications not having an existing template are created based on identifying extension hooks in the corresponding extension artefact.

In some embodiments of the computer system, the computer program code further comprises sets instructions executable by the one or more processors to retrieve the one or more extension artefacts from the source system using a platform connector.

In some embodiments of the computer system, the compiling of the one or more extension simulations includes converting the one or more parsed extension artefacts into the target format of a target platform.

Some embodiments provide one or more non-transitory computer-readable medium storing computer program code. The computer program code comprising sets of instructions to obtain one or more extension artefacts of an extension of a source application on a source system. The computer program code further comprising sets of instructions to parse each of the one or more extension artefacts into a target format of a target platform based on a type of the corresponding extension artefact. The computer program code further comprising sets of instructions to identify one or more target applications of the target platform based on an identifier of the source application. The computer program code further comprising sets of instructions to compile one or more extension simulations for each of the one or more the one or more target applications. The computer program code further comprising sets of instructions to provide a user interface enabling a user to select one or more selected simulations from among the one or more extension simulations. The computer program code further comprising sets of instructions to publish the one or more selected simulations to the target platform such that the one or more corresponding extensions are implemented in corresponding target applications.

In some embodiments of the non-transitory computer-readable medium, each of the one or more extension artefacts includes one or more identifiers, one or more fields, one or more properties, one or more labels, or one or more objects for customizing the source application.

In some embodiments of the non-transitory computer-readable medium, the parsing of each of the one or more extension artefacts based on the type of the corresponding extension artefact includes: parsing a screen enhancement type extension artefact based on a field name and a field type; parsing a user interface analysis type extension artefact based on an application identifier and an extension hook identifier; parsing a logic type extension artefact based on an object name and an object type; parsing a data dictionary type extension artefact based on a parent object, a sub-object identifier, and an object source; or parsing a source transaction type extension artefact based on a transaction identifier and an application component identifier.

In some embodiments of the non-transitory computer-readable medium, the identifying of the one or more target applications of the target platform is further based on an application component of a corresponding extension artefact.

In some embodiments of the non-transitory computer-readable medium, the computer program code further comprises sets of instructions to identify whether a template exists for each of the one or more target applications. In such embodiments, extensions for target applications having an existing template are created based on a pre-determined template schema and extensions for target applications not having an existing template are created based on identifying extension hooks in the corresponding extension artefact.

In some embodiments of the non-transitory computer-readable medium, the computer program code further comprises sets of instructions to retrieve the one or more extension artefacts from the source system using a platform connector.

In some embodiments of the non-transitory computer-readable medium, the compiling of the one or more extension simulations includes converting the one or more parsed extension artefacts into the target format of a target platform.

Some embodiments provide a computer-implemented method. The computer-implemented method comprises obtaining one or more extension artefacts of an extension of a source application on a source system. The computer-implemented method further comprises parsing each of the one or more extension artefacts into a target format of a target platform based on a type of the corresponding extension artefact. The computer-implemented method further comprises identifying one or more target applications of the target platform based on an identifier of the source application. The computer-implemented method further comprises compiling one or more extension simulations for each of the one or more the one or more target applications. The computer-implemented method further comprises providing a user interface enabling a user to select one or more selected simulations from among the one or more extension simulations. The computer-implemented method further comprises publishing the one or more selected simulations to the target platform such that the one or more corresponding extensions are implemented in corresponding target applications.

In some embodiments of the computer-implemented method, each of the one or more extension artefacts includes one or more identifiers, one or more fields, one or more properties, one or more labels, or one or more objects for customizing the source application.

In some embodiments of the computer-implemented method, the parsing of each of the one or more extension artefacts based on the type of the corresponding extension artefact includes parsing a screen enhancement type extension artefact based on a field name and a field type; parsing a user interface analysis type extension artefact based on an application identifier and an extension hook identifier; parsing a logic type extension artefact based on an object name and an object type; parsing a data dictionary type extension artefact based on a parent object, a sub-object identifier, and an object source; or parsing a source transaction type extension artefact based on a transaction identifier and an application component identifier.

In some embodiments of the computer-implemented method, the identifying of the one or more target applications of the target platform is further based on an application component of a corresponding extension artefact.

In some embodiments of the computer-implemented method, identifying whether a template exists for each of the one or more target applications. In such embodiments, extensions for target applications having an existing template are created based on a pre-determined template schema and extensions for target applications not having an existing template are created based on identifying extension hooks in the corresponding extension artefact.

In some embodiments of the computer-implemented method, the compiling of the one or more extension simulations includes converting the one or more parsed extension artefacts into the target format of a target platform.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
   one or more processors;
   one or more machine-readable medium coupled to the one or more processors and storing computer program code comprising sets instructions executable by the one or more processors to:
   obtain one or more extension artefacts of an extension of a source application on a source system, the one or more extension artefacts comprising code for extending the functionality of the source application;
   parse each of the one or more extension artefacts into a target format of a target platform based on a type of the corresponding extension artefact;
   identify one or more target applications of the target platform based on an identifier of the source application;
   compile one or more extension simulations for each of the one or more target applications;
   provide a user interface enabling a user to select one or more selected simulations from among the one or more extension simulations; and
   publish the one or more selected simulations to the target platform such that the one or more corresponding extensions are implemented in corresponding target applications,
   wherein the parsing of each of the one or more extension artefacts based on the type of the corresponding extension artefact includes
   parsing a screen enhancement type extension artefact based on a field name and a field type,
   parsing a user interface analysis type extension artefact based on an application identifier and an extension hook identifier,
   parsing a logic type extension artefact based on an object name and an object type,
   parsing a data dictionary type extension artefact based on a parent object, a sub-object identifier, and an object source, or
   parsing a source transaction type extension artefact based on a transaction identifier and an application component identifier.

2. The computer system of claim 1, wherein each of the one or more extension artefacts includes one or more identifiers, one or more fields, one or more properties, one or more labels, or one or more objects for customizing the source application.

3. The computer system of claim 1, wherein the identifying of the one or more target applications of the target platform is further based on an application component of a corresponding extension artefact.

4. The computer system of claim 1, wherein the computer program code further comprises sets of instructions executable by the one or more processors to:
identify whether a template exists for each of the one or more target applications, wherein extensions for target applications having an existing template are created based on a pre-determined template schema, and wherein extensions for target applications not having an existing template are created based on identifying extension hooks in the corresponding extension artefact.

5. The computer system of claim 1, wherein the computer program code further comprises sets instructions executable by the one or more processors to:
retrieve the one or more extension artefacts from the source system using a platform connector.

6. The computer system of claim 1, wherein the compiling of the one or more extension simulations includes converting the one or more parsed extension artefacts into the target format of a target platform.

7. One or more non-transitory computer-readable medium storing computer program code comprising sets of instructions to:
obtain one or more extension artefacts of an extension of a source application on a source system, the one or more extension artefacts comprising code for extending the functionality of the source application;
parse each of the one or more extension artefacts into a target format of a target platform based on a type of the corresponding extension artefact;
identify one or more target applications of the target platform based on an identifier of the source application;
compile one or more extension simulations for each of the one or more target applications;
provide a user interface enabling a user to select one or more selected simulations from among the one or more extension simulations; and
publish the one or more selected simulations to the target platform such that the one or more corresponding extensions are implemented in corresponding target applications,
wherein the parsing of each of the one or more extension artefacts based on the type of the corresponding extension artefact includes
parsing a screen enhancement type extension artefact based on a field name and a field type,
parsing a user interface analysis type extension artefact based on an application identifier and an extension hook identifier,
parsing a logic type extension artefact based on an object name and an object type,
parsing a data dictionary type extension artefact based on a parent object, a sub-object identifier, and an object source, or
parsing a source transaction type extension artefact based on a transaction identifier and an application component identifier.

8. The non-transitory computer-readable medium of claim 7, wherein each of the one or more extension artefacts includes one or more identifiers, one or more fields, one or more properties, one or more labels, or one or more objects for customizing the source application.

9. The non-transitory computer-readable medium of claim 7, wherein the identifying of the one or more target applications of the target platform is further based on an application component of a corresponding extension artefact.

10. The non-transitory computer-readable medium of claim 7, wherein the computer program code further comprises sets of instructions to:
identify whether a template exists for each of the one or more target applications, wherein extensions for target applications having an existing template are created based on a pre-determined template schema, and wherein extensions for target applications not having an existing template are created based on identifying extension hooks in the corresponding extension artefact.

11. The non-transitory computer-readable medium of claim 7, wherein the computer program code further comprises sets of instructions to:
retrieve the one or more extension artefacts from the source system using a platform connector.

12. The non-transitory computer-readable medium of claim 7, wherein the compiling of the one or more extension simulations includes converting the one or more parsed extension artefacts into the target format of a target platform.

13. A computer-implemented method, comprising:
obtaining one or more extension artefacts of an extension of a source application on a source system, the one or more extension artefacts comprising code for extending the functionality of the source application;
parsing each of the one or more extension artefacts into a target format of a target platform based on a type of the corresponding extension artefact;
identifying one or more target applications of the target platform based on an identifier of the source application;
compiling one or more extension simulations for each the one or more target applications;
providing a user interface enabling a user to select one or more selected simulations from among the one or more extension simulations; and
publishing the one or more selected simulations to the target platform such that the one or more corresponding extensions are implemented in corresponding target applications,
wherein the parsing of each of the one or more extension artefacts based on the type of the corresponding extension artefact includes
parsing a screen enhancement type extension artefact based on a field name and a field type,
parsing a user interface analysis type extension artefact based on an application identifier and an extension hook identifier,
parsing a logic type extension artefact based on an object name and an object type,
parsing a data dictionary type extension artefact based on a parent object, a sub-object identifier, and an object source, or
parsing a source transaction type extension artefact based on a transaction identifier and an application component identifier.

14. The computer-implemented method of claim 13, wherein each of the one or more extension artefacts includes one or more identifiers, one or more fields, one or more properties, one or more labels, or one or more objects for customizing the source application.

15. The computer-implemented method of claim 13, wherein the identifying of the one or more target applications of the target platform is further based on an application component of a corresponding extension artefact.

16. The computer-implemented method of claim 13, further comprising:
   identifying whether a template exists for each of the one or more target applications, wherein extensions for target applications having an existing template are created based on a pre-determined template schema, and wherein extensions for target applications not having an existing template are created based on identifying extension hooks in the corresponding extension artefact.

17. The computer-implemented method of claim 13, wherein the compiling of the one or more extension simulations includes converting the one or more parsed extension artefacts into the target format of a target platform.

* * * * *